(12) United States Patent
Bohin et al.

(10) Patent No.: US 6,562,180 B1
(45) Date of Patent: May 13, 2003

(54) CROSS-LINKABLE ADHESIVE SILICONE COMPOSITION AND USE OF SAID COMPOSITION FOR BONDING VARIOUS SUBSTRATES

(75) Inventors: Fabrice Bohin, Levallois Perret (FR); Gerard Joubert, Pont Eveque (FR); Olivier Loubet, Lyons (FR); Alain Pouchelon, Meyzieu (FR); Dominique Lorenzetti, Caluire (FR)

(73) Assignee: Rhodia Chimie, Courbevoie Cedex (FR)

(*) Notice: Subject to any disclaimer, the term of this patent is extended or adjusted under 35 U.S.C. 154(b) by 0 days.

(21) Appl. No.: 09/623,083

(22) PCT Filed: Feb. 24, 1999

(86) PCT No.: PCT/FR99/00419

§ 371 (c)(1),
(2), (4) Date: Apr. 13, 2001

(87) PCT Pub. No.: WO99/43753

PCT Pub. Date: Sep. 2, 1999

(30) Foreign Application Priority Data

Feb. 27, 1998 (FR) .............................................. 98 02651

(51) Int. Cl.[7] ...................... C09J 183/04; C09J 183/05; C09J 183/07; C08G 77/04
(52) U.S. Cl. ...................... 156/329; 156/306.3; 528/15; 528/17; 528/31; 528/32; 528/34
(58) Field of Search ............................... 528/15, 17, 31, 528/32, 34; 156/306.3, 329

(56) References Cited

U.S. PATENT DOCUMENTS 5,283,307 A * 2/1994 Larson ........................ 524/264
5,364,921 A 11/1994 Gray et al.
5,595,826 A 1/1997 Gray et al.
5,658,674 A * 8/1997 Lorenzetti et al. ....... 428/423.5

FOREIGN PATENT DOCUMENTS

| EP | 0599532 A2 | 6/1994 |
|---|---|---|
| EP | 0757080 A2 | 2/1997 |
| EP | 0816465 A2 | 1/1998 |
| FR | 0681014 A1 | 11/1995 |

* cited by examiner

Primary Examiner—Robert Dawson
Assistant Examiner—Jeffrey B. Robertson
(74) Attorney, Agent, or Firm—Burns, Doane, Swecker & Mathis, L.L.P.

(57) ABSTRACT

The invention concerns a cross-linkable adhesive silicone composition, and the use of said composition for bonding various substrates, comprising: a polyorganosiloxane (POS) with Si-Vi(polydimethylsiloxane α,ω-dj-Vi) units; a crosslinking POS with SiH units; a platinum catalyst; an adherence promoter comprising vinyltrimethoxysilane, 3-glycidoxy-propyltrimethoxysilane and buryl titanate; and optionally a filler and/or a cross linkage inhibitor and/or an unsaturated POS resin such as $MM^{vi}DD^{vi}Q$ or $MD^{vi}Q$. The invention aims at providing a highly adhesive glue having, before setting, a low viscosity adapted for easy application on the substrates to be bonded. The invention achieves this by providing a cross-linkable adhesive silicone composition as defined above and characterised in that it has a peeling force $F_p \geq 0.25$ N/mm. a viscosity $\eta \geq 50.10^3$ mPa's at 25°, a tear resistance $R_d \geq 6$/mm (ASTM-624A) and a Shore hardness $A \geq 35$. The invention also concerns the use of said composition as adhesive.

20 Claims, No Drawings

CROSS-LINKABLE ADHESIVE SILICONE COMPOSITION AND USE OF SAID COMPOSITION FOR BONDING VARIOUS SUBSTRATES

The general field of the invention is that of silicone elastomer compositions which are crosslinkable by addition and/or condensation. The polyorganosiloxanes (POS) considered are of the room-temperature vulcanizable (RTV) type, given that they are conventionally in the form of a two-component system (RTV-2) whose vulcanization can be accelerated under warm conditions.

The context of the invention relates more especially to self-adhesive silicone compositions which crosslink by an addition reaction, whose kinetics can be significantly increased by raising the temperature.

Even more specifically, the present invention is directed towards adhesive silicone compositions which can be crosslinked by addition and which also use coupling reactions to develop the adhesion.

The invention also relates to the use of such a silicone composition as an adhesive.

The crosslinking and incidental curing of these silicone compositions, applied at the interface between two solids, participate in the adhesion mechanism which makes it possible to bind the two solids to each other. Crosslinking by addition involves unsaturated groups, in particular alkenyls and even more particularly vinyls (Vi), linked to the silicon in the POS (Si-Vi units) as well as hydrogens linked to the silicon of the same or of another POS (SiH units). These reactions can be likened to hydrosilylations of the Si-Vi units by Si-H units.

The coupling required for the adhesion involves alkoxy groups OR, linked to the silicon atoms of silanes and/or of other alkoxide groups (POS resins) in the composition.

The crosslinkings by addition can advantageously be catalysed by metal compounds which are, respectively, of platinum type.

Silicone elastomer compositions which can be used for coating various woven or nonwoven fibrous supports are already known for applications other than those of bonding. After crosslinking, the film coated on the support forms a protective and mechanically reinforcing coat. Such fibrous supports thus coated with a crosslinked silicone elastomer film can be used for the manufacture of inflatable bags for the personal protection of the occupants of vehicles (airbags). An example of such silicone elastomer compositions is given in European patent application No. 0,681,014 in the name of the Applicant, and concerning a silicone elastomer coating composition of the room-temperature vulcanizable type, consisting of a mixture formed of:

(I) at least one polyorganosiloxane containing, per molecule, at least two $C_2$–$C_6$ alkenyl groups linked to the silicon, (II) at least one polyorganosiloxane containing, per molecule, at least three hydrogen atoms linked to the silicon, (III) a catalytically effective amount of at least one catalyst, composed of at least one metal belonging to the platinum group, (IV) an adhesion promoter, (V) optionally, an inorganic filler, (VI) optionally, at least one crosslinking inhibitor, and (VII) optionally, at least one unsaturated polyorganosiloxane resin, characterized in that the adhesion promoter exclusively contains:

(IV.1) at least one alkoxylated organosilane containing, per molecule, at least one $C_2$–$C_6$ alkenyl group, (IV.2) at least one organosilicon compound comprising at least one epoxy radical, (IV.3) at least one chelate of a metal M and/or a metal alkoxide of general formula: $M(OJ)_n$, where n=valency of M and J=linear or branched $C_1$–$C_8$ alkyl, M being chosen from the group formed by: Ti, Zr, Ge, Li, Mn, Fe, Al, Mg.

More specifically, this coating composition can comprise:

(I)—Si-Vi POS of the $\alpha,\omega$-$(CH_3)_2ViSiO_{0.5}$ polydimethylsiloxane type of viscosity=100,000 mPa·s at 25° C.;

(II)—SiH POS of the polydimethyl-methylhydrogeno-$\alpha,\omega$-$(CH_3)_2HSiO_{0.5}$ type;

(III)—Platinum catalyst (IV)—Promoter:
(IV.1) =vinyltrimethoxysilane (VTMO)
(IV.2) =3-glycidoxypropyltrimethoxysilane (GLYMO),
(IV.3) =butyl orthotitanate (TBOT);

(V)—Filler=ground silica or reinforced silica (VI)—Optional inhibitor=ethynylcyclohexanol (ECH)

(VII)—Optional POS resin bearing unsaturation(s), of following formula, expressed as siloxy units: $MM^{vi}D$-$D^{vi}Q$ in which
$M=(CH_3)_3SiO_{0.5}$
$M^{vi}=(CH_3)_2ViSiO_{0.5}$
$D=(CH_3)_2SiO$
$D^{vi}=CH_3ViSiO$
$Q=SiO_2$.

The silicone coating obtained after crosslinking the coating film based on this composition has good hardness, mechanical strength, surface uniformity and heat-resistance properties. The promoter IV according to the invention claimed in that European patent application affords improved adhesion of the coating to the fabric. This is reflected in a wrinkle test, standard FFG 37 110, of a coated fabric, by a threshold ranging from 350 to 600 cycles for the samples tested in the examples.

Since the primary purpose of the compositions according to that patent application EP 0,681,014 is not to bond two components to each other, it is clear that its adhesion power is not optimized. In any case, this coating composition could not constitute a bonding agent.

Another illustration of the prior art which may be mentioned is European patent application EP 0,326,712, which discloses a crosslinkable POS composition comprising:

an $\alpha,\omega$-$(CH_3)_2ViSiO_{0.5}$ polydimethylsiloxane with a degree of polymerization DP of 300;

an SiH POS of the $\alpha,\omega$-$(CH_3)_3SiO_{0.5}$ polydimethylmethylhydrogenosiloxane type;

a platinum catalyst;

a crosslinking inhibitor such as 3-methyl-1-butyn-3-ol, and an adhesion promoter comprising glymo, and a diallyl ether of trimethylolpropane, of ethylene glycol or of glycerol.

According to that patent application EP 0,326,712, a silicone composition can be used as an adhesive. However, the performance obtained in this respect remains modest, as evidenced by the adhesion tests carried out according to a test JIS K 6301. The maximum adhesion values obtained are about 30 kilos per $cm^2$ and vary depending on the substrate.

In the face of such prior art which does not propose an adhesive based on a silicone composition which is crosslinkable by addition/coupling and which has all the specifications expected for bonding agents, i.e.:

stability on storage, viscosity of the liquid form of the composition satisfying the requirements for ease of application to the substrates to be adhesively bonded, high adhesive power, heat resistance, stability of the adhesive bond over time, low cost price.

The Applicant set itself the essential aim of overcoming this deficiency.

It thus sought to develop a silicone-based adhesive liquid composition which is crosslinkable by SiH/SiVi addition and which satisfies the abovementioned specifications. Another essential aim of the present invention is to recommend the use of a silicone composition, which is crosslinkable by addition, as an adhesive for adhesively bonding various substrates, for example metals or plastics.

Another essential aim of the present invention is to provide a crosslinkable silicone composition or a use of this composition for the adhesive bonding of electrical/electronic components or mechanical components, in particular in the field of motor vehicles or the field of household appliances (connection).

Another essential aim of the present invention is to provide a process for adhesively bonding at least two substrates using a crosslinkable silicone composition, the said process readily and economically giving a solid and long-lasting assembly between the two substrates.

In order to achieve these aims, the inventors have, to their merit, demonstrated, entirely surprisingly and unexpectedly and after long and laborious research, an astute and advantageous selection of a subgroup of crosslinkable silicone elastomer compositions, from among the large group of compositions disclosed in EP 681,014. This subgroup has the particular feature of being singularly adhesive and of moreover having all of the characteristics, and in particular the Theological and mechanical characteristics, for forming an excellent adhesive.

Thus, the present invention satisfies the abovementioned aims, inter alia, by proposing, firstly, a crosslinkable adhesive silicone composition of the type comprising:

(I) at least one polyorganosiloxane containing, per molecule, at least two alkenyl groups linked to the silicon, (II) at least one polyorganosiloxane containing, per molecule, at least three hydrogen atoms linked to the silicon, (III) a catalytically effective amount of at least one catalyst, composed of at least one metal belonging to the platinum group, (IV) an adhesion promoter based on:
  (IV.1) at least one alkoxylated organosilane containing, per molecule, at least one $C_2$–$C_6$ alkenyl group,
  (IV.2) at least one organosilicon compound comprising at least one epoxy radical,
  (IV.3) at least one chelate of a metal M and/or a metal alkoxide of general formula: $M(OJ)_n$, where n=valency of M and J=linear or branched $C_1$–$C_8$ alkyl, (V) optionally, an inorganic filler, (VI) optionally, at least one crosslinking inhibitor, and (VII) optionally, at least one polyorganosiloxane resin, bearing siloxy units Q and/or T and alkenyl groups, characterized by α—its peeling force $F_p$ (N/mm) measured in a test $T_p$, of greater than or equal to 0.25, preferably greater than or equal to 0.50;

β—its viscosity η ($10^3$ mPa·s at 25° C.), immediately after mixing together all of its constituents, of greater than or equal to 50, preferably between 50 and 300 and even more preferably between 50 and 150;

δ—its tear strength $R_d$ (N/mm) after crosslinking, measured by a test Td (ASTM-624A), of greater than or equal to 6, preferably between 7 and 25 and even more preferably between 8 and 20;

γ—its Shore A hardness, referred to hereinbelow as the hardness D, after crosslinking, measured by a test $T_s$ (DIN 5335), of greater than or equal to 35, preferably between 40 and 65 and even more preferably between 40 and 55.

The crosslinkable adhesive silicone composition thus defined in accordance with the invention by its functional characteristics Fp, η, Rd and D corresponds to a limited number of formulations. These functional characteristics qualitatively and quantitatively define the compounds I to VII of the composition. It is entirely within the competence of a person skilled in the art to develop the composition according to the invention, on the basis of the characteristics η, Fp, Rd and D, using the teaching of the present specification and his or her normal scientific and technical knowledge.

In particular, it is possible to modify the viscosity of the composition by varying the chain length and the molecular weight of the POS I and/or II, by adjusting the concentration of the crosslinking POS II and/or the number of SiH sites contained therein, by choosing more or less high concentrations of catalysts/or by using an alkenylated POS VII resin, for example a vinyl resin with a crosslinking network which is more or less dense depending on the amount of siloxy units Q and/or T=$CH_3SiO_{1.5}$.

The composition according to the invention is a high-quality bonding agent, which is in a liquid form which can readily be applied by any means, which is known per se and suitable, onto the substrates to be assembled (e.g. calendering—casting—rollers—scraper, etc.).

This adhesive silicone composition has high adhesion power and stability on storage before crosslinking, stability of the adhesive bond after crosslinking and heat resistance of the bonding joint, which are entirely satisfactory.

As regards the characteristic α, the test Tp for measuring the peeling force Fp, is defined by the following procedure:

1—Coating

The mixture of the constituents I to VII is prepared manually or using a pneumatic spray gun with a static mixer.

The adhesive silicone composition I to VII is deposited by serigraphy with different meshes (75-micron nylon mesh or 50-micron stainless steel mesh). This allows the amounts of composition deposited to be varied from 20 to 100 g/mg$^2$.

The test pieces are sheets of plastic substrate Sa as defined below in Example 4, which have dimensions of 100×150 mm. The coated surface is 50×100 mm.

On each coating, the amount of RTV composition is weighed accurately.

2—Pressing

For each test sample, two test pieces of fabric of 150× 100×2 mm are attached together and placed between two antiadhesive sheets. They are then subjected to a pressure of one tonne supplied by a 10-tonne hydraulic press, heated to 160° C.

The pressure applied to the fabric is about 30 N/cm² (ignoring the thickness of the RTV composition bonding joint).

The pressing time is 3 min after closing the press.

3—Peeling

Measurement of the peeling is carried out using a dynamometer with a 100 N cell. The pulling is carried out over a width of 50 mm (coating width, suppression of edge effect) and over a length of 50 mm, at 50 mm/min.

4—Result

The newtons per 50 mm of width are measured for the pullings. The peeling force Fp is expressed in N/mm.

As regards the viscosity η of the adhesive silicone composition according to the invention, it should be noted that this viscosity, just as for all those concerned in the present specification, corresponds to a so-called "Newtonian" magnitude of dynamic viscosity at 25° C., i.e. the dynamic viscosity which is measured, in a manner which is known per se, at a shear rate gradient which is low enough for the viscosity measured to be independent of the rate gradient.

This viscosity η (characteristic β) is the one measured in the 5 min following mixing of all of the constituents I to VII, before any significant appearance of the curing induced by the crosslinking by addition/coupling, which does not fail to take place as soon as the products I, II, III and optionally IV are placed together, and/or as soon as the products IV and I, II, III and VII react together by coupling under the effect of the ambient humidity and/or by opening epoxy rings.

The viscometer used can be of the needle rheometer type, such as those of brand name Brookfield®.

In accordance with the invention, the state of the composition after crosslinking is the state in which the composition must be found in order to be able to carry out the tests Tp, Td and Ts. It is defined by the arrival at a steady-stage value of its modulus of stretch and of its hardness.

The test Td for measuring the tear strength Rd is the one corresponding to ASTM standard 524A.

As regards the hardness D, it is measured by the test Ts which corresponds to a DIN standard 5335.

Besides the selection of a subgroup which comprises crosslinkable adhesive silicone compositions and which is circumscribed by the parameters α, β, 67 and γ, the present invention is also directed towards the use, as an adhesive, of the type comprising:

(I) at least one polyorganosiloxane containing, per molecule, at least two alkenyl groups linked to the silicon, (II) at least one polyorganosiloxane containing, per molecule, at least three hydrogen atoms linked to the silicon, (III) a catalytically effective amount of at least one catalyst, composed of at least one metal belonging to the platinum group, (IV) an adhesion promoter based on:
  (IV.1) at least one alkoxylated organosilane containing, per molecule, at least one $C_2$–$C_6$ alkenyl group,
  (IV.2) at least one organosilicon compound comprising at least one epoxy radical,
  (IV.3) at least one chelate of a metal M and/or a metal alkoxide of general formula: $M(OJ)_n$, where n=valency of M and J=linear or branched $C_1$–$C_8$ alkyl, (V) optionally, an inorganic filler, (VI) optionally, at least one crosslinking inhibitor, and (VII) optionally, at least one polyorganosiloxane resin, bearing siloxy units Q and/or T and alkenyl groups.

Without this being limiting, the composition used according to the invention is preferably the one defined above.

Thus, the peeling force $F_p$ (N/mm) measured in a test $T_p$ is greater than or equal to 0.25, preferably greater than or equal to 0.50.

Moreover, according to a noteworthy characteristic, the composition I to VII used according to the invention has, in crosslinked form, the characteristics β, δ and γ as defined above.

By virtue of the use recommended by the invention, a high-quality and cost-effective crosslinkable silicone bonding agent is provided.

Moreover, the composition and the use according to the invention are advantageous in that they provide a bonding agent which sets quickly under hot conditions (for example between 10 and 180 s at 160° C., depending on the case), the said bonding agent being stable for several days at room temperature.

Furthermore, the fact that it is very easy to handle at room temperature constitutes another positive point which is particularly appreciable in practice.

Compared with organic bonding agents, the composition and the use of this adhesive RTV silicone allows non-hot-melt adhesive bonding. This means that once it has crosslinked, the composition according to the invention does not become reconverted to liquid since it is not thermoplastic.

The heat resistance of an adhesive bond according to the invention can be, for example, up to 225° C.

In accordance with a preferred arrangement of the invention, the alkoxylated organosilane (IV.1) of the promoter (IV) is more particularly selected from the products of the following general formula:

$$R^1R^2C{=}\underset{R^3}{C}{-}(A)_{x'}{-}L{-}\underset{R_x^4}{\overset{|}{Si}}{-}(OR^5)_{3-x} \tag{IV.1}$$

in which:

$R^1$, $R^2$ and $R^3$ are hydrogen or identical or different hydrocarbon-based radicals and preferably represent hydrogen, a linear or branched $C_1$–$C_4$ alkyl or a phenyl optionally substituted with at least one $C_1$–$C_3$ alkyl, A is a linear or branched $C_1$–$C_4$ alkylene, L is a valency bond or oxygen, $R^4$ and $R^5$ are identical or different radicals and represent a linear or branched $C_{1-4}$ alkyl, x'=0 or 1, x=0 to 4, preferably 0 or 1 and even more preferably 0.

Without this being limiting, it may be considered that vinyltrimethoxysilane is a particularly suitable compound (IV.1).

The organosilicon compound (IV.2) is chosen
  either from the products (IV.2a) corresponding to the following general formula:

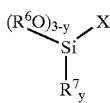
(IV.2a)

in which:
R$^6$ is a linear or branched C$_1$–C$_4$ alkyl radical,
R$^7$ is a linear or branched alkyl radical,
y is equal to 0, 1, 2 or 3, preferably equal to 0 or 1 and even more preferably equal to 0,

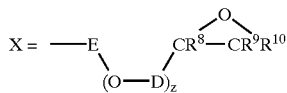

with
∆E and D which are identical or different radicals chosen from linear or branched C$_1$–C$_4$ alkylene radicals,
∆z which is equal to 0 or 1,
∆R$^8$, R$^9$ and R$^{10}$ which are identical or different radicals representing hydrogen or a linear or branched C$_1$–C$_4$ alkyl, hydrogen being more particularly preferred,
∆R$^8$, R$^9$ and R$^{10}$ optionally being able to constitute, together with the two carbons bearing the epoxy, a 5- to 7-membered alkyl ring,
or from the products (IV.2 b) consisting of epoxy-functional polydiorganosiloxanes containing at least one unit of formula:

$$X_pG_qSiO_{\frac{4-(p+q)}{2}}$$ (IV.2b$_1$)

in which:
X is the radical as defined above for formula (IV.2 a),
G is a monovalent hydrocarbon-based group which has no unfavourable action on the activity of the catalyst and is preferably chosen from alkyl groups containing from 1 to 8 carbon atoms inclusive, advantageously from methyl, ethyl, propyl and 3,3,3-trifluoropropyl groups as well as from aryl groups and, advantageously, from xylyl and tolyl and phenyl radicals,
p=0,1 or 2,
q=1,2 or 3,
p+q=1,2 or 3,
optionally at least some of the other units of these polydiorganosiloxanes are units of average formula:

$$G_rSiO_{\frac{4-r}{2}}$$ (IV.2b$_2$)

in which G has the same meaning as above and r has a value of between 0 and 3, for example between 1 and 3.

The compounds (IV.2) are thus preferably epoxyalkoxy-silicon compounds and even more preferably epoxyalkoxy-monosilanes (IV.2 a).

As examples of such compounds (IV.2), mention may be made of:

3-glycidoxypropyltrimethoxysilane (GLYMO) or
3,4-epoxycyclohexylethyltrimethoxysilane, etc.

As regards the last essential compound (IV.3) of the adhesion promoter (IV), the preferred products are those in which the metal M is chosen from the following list: Ti, Zr, Ge, Li, Mn. It should be pointed out that titanium is more particularly preferred. It can be combined, for example, with an alkyl radical such as butyl.

In practice, the adhesion promoter (IV) is, e.g.:

vinyltrimethoxysilane (VTMS)/3-glycidoxypropyltrimethoxysilane (GLYMO)/butyl titanate.

In quantitative terms, it may be pointed out that the weight proportions between (IV.1), (IV.2) and (IV.3), expressed as weight percentages relative to the total of the three, are as follows:

(IV.1) between 15 and 70 and preferably between 30 and 50, (IV.2) between 15 and 70 and preferably between 30 and 50, (IV.3) between 5 and 25 and preferably between 10 and 20, it being understood that the sum of these proportions in (IV.1), (IV.2) and (IV.3) is equal to 100%.

In an entirely advantageous manner, it has been possible to detect a correlation, on the one hand, between the adhesion performance and the structural performance of the elastomeric silicone coating, and, on the other hand, the weight ratio (IV.2):(IV.1). Thus, this ratio is preferably between 2:1 and 0.5:1, the ratio 1:1 being more particularly preferred.

Advantageously, the adhesion promoter is present in a proportion of from 0.1 to 10, preferably 0.5 to 8 and even more preferably 1 to 5%, by weight relative to all of the constituents of the composition.

The composition used according to the invention can comprise at least one unsaturated POS resin (VII) containing at least two alkenyl, preferably vinyl, residues per molecule.

Advantageously, the POS resin (VII) contains in its structure from 0.1 to 20% by weight of alkenyl group(s), the said structure having at least two different units chosen from the units of types M, D, T and Q, at least one of these units being a unit of type T or Q.

In practice, this resin (VII) preferably corresponds to one of the following two formulae:

(VII.1)MM$^{vi}$DD$^{vi}$Q or MD$^{vi}$Q    (VII.2)

This resin (VII) participates in establishing the Theological, mechanical and adhesive properties of the composition. It is known that the siloxy units Q play a relatively important role in this respect. Thus, in accordance with an advantageous arrangement of the invention, the resin (VII) contains units Q in a proportion of at least 5%, preferably at least 7%, and even more preferably in a proportion of from 8 to 30%.

According to one variant, the resin (VII) comprises siloxy units T.

The polyorganosiloxane (I) is, on a weight basis, one of the essential constituents of the composition used according to the invention. Advantageously, it is a product containing units of formula:

$$W_aZ_bSiO_{\frac{4-(a+b)}{2}} \quad (I.1)$$

in which:
W is an alkenyl, preferably vinyl or alkyl group,
Z is a monovalent hydrocarbon-based group which has no unfavourable action on the activity of the catalyst and is preferably chosen from alkyl groups containing from 1 to 8 carbon atoms inclusive, advantageously from methyl, ethyl, propyl and 3,3,3-trifluoropropyl groups as well as from aryl groups and, advantageously from xylyl and tolyl and phenyl radicals,
a is 1 or 2, b is 0, 1 or 2 and a+b is between 1 and 3, optionally at least some of the other units are units of average formula:

$$Z_cSiO_{\frac{4-c}{2}} \quad (I.2)$$

in which Z has the same meaning as above and c has a value of between 0 and 3, for example between 1 and 3.

It is advantageous for this polydiorganosiloxane to have a viscosity at least equal to 10 mPa·s, preferably at least equal to 1000 mPa·s and even more preferably between 5000 and 200,000 mPa·s. As an example of a compound (I), mention may be made of polydimethylsiloxane.

The polyorganosiloxane (I) can be formed exclusively of units of formula (I.1) or can also contain units of formula (I.2). Similarly, it can have a linear, branched, cyclic or network structure. Its degree of polymerization is preferably between 2 and 5000.

Z is generally chosen from methyl, ethyl and phenyl radicals, at least 60 mol % of the radicals Z being methyl radicals.

Examples of siloxy units of formula (I.1) are the vinyldimethylsiloxane unit, the vinylphenylmethylsiloxane unit and the vinylsiloxane unit.

Examples of siloxy units of formula (I.2) are the units $SiO_{4/2}$, dimethylsiloxane, methylphenylsiloxane, diphenylsiloxane, methylsiloxane and phenylsiloxane.

Examples of polyorganosiloxanes (I) are dimethylpolysiloxanes containing dimethylvinylsilyl ends, methylvinyldimethylpolysiloxane copolymers containing trimethylsilyl ends, methylvinyldimethylpolysiloxane copolymers containing dimethylvinylsilyl ends and cyclic methylvinylpolysiloxanes.

The polyorganosiloxane (II) is preferably of the type containing siloxy units of formula:

$$H_dL_eSiO_{\frac{4-(d+e)}{2}} \quad (II.1)$$

in which:
L is a monovalent hydrocarbon-based group which has no unfavourable action on the activity of the catalyst and is preferably chosen from alkyl groups containing from 1 to 8 carbon atoms inclusive and advantageously from methyl, ethyl, propyl and 3,3,3-trifluoropropyl groups, as well as from aryl groups and, advantageously, from xylyl and tolyl and phenyl radicals,
d is 1 or 2, e is 0, 1 or 2, d+e has a value of between 1 and 3,
optionally, at least some of the other units being units of average formula:

$$L_gSiO_{\frac{4-g}{2}} \quad (II.2)$$

in which L has the same meaning as above and g has a value of between 0 and 3.

The dynamic viscosity of this polyorganosiloxane (II) is ≧5, preferably ≧10 and even more preferably is between 20 and 1000 mPa·s.

As an example of a polyorganosiloxane (II), mention may be made of poly(dimethylsiloxane) (methylhydrogenosiloxy)-α-ω-dimethylhydrogenosiloxane.

The polyorganosiloxane (II) can be formed exclusively of units of formula (II.1) or can also contain units of formula (II.2).

The polyorganosiloxane (II) can contain a linear, branched, cyclic or network structure. The degree of polymerization is greater than or equal to 2. More generally, it is less than 5000.

The group L has the same meaning as the group Z above.
Examples of units of formula (II.1) are:

$$H(CH_3)_2SiO_{1/2}, HCH_3SiO_{2/2}, H(C_6H_5)SiO_{2/2}$$

The examples of units of formula (II.2) are the same as those given above for the units of formula (I.2).

Examples of polyorganosiloxanes (II) are:
dimethylpolysiloxanes containing hydrogenodimethylsilyl ends,
copolymers containing dimethylhydrogenomethylpolysiloxane (dimethyl) units containing trimethylsilyl ends,
copolymers containing dimethylhydrogenomethylpolysiloxane units containing hydrogenodimethylsilyl ends,
hydrogenomethylpolysiloxanes containing trimethylsilyl ends,
cyclic hydrogenomethylpolysiloxanes.

The ratio of the number of hydrogen atoms linked to the silicon in the polyorganosiloxane (I) to the number of groups containing alkenyl unsaturation in the polyorganosiloxane (II) is between 0.4 and 10, preferably between 0.8 and 3.

The polyorganosiloxane (I) and/or the polyorganosiloxane (II) can be diluted in a non-toxic organic solvent which is compatible with the silicones.

The network polyorganosiloxanes (I) and (II) are commonly referred to as silicone resins.

The polyaddition silicone composition bases can contain only linear polyorganosiloxanes (I) and (II) such as, for example, those described in the patents: U.S. Pat. No. 3,220,972, U.S. Pat. No. 3,697,473 and U.S. Pat. No. 4,340,709, or can contain both branched or network polyorganosiloxanes (I) and (II), such as, for example, those described in the patents: U.S. Pat. No. 3,284,406 and U.S. Pat. No. 3,434,366.

The catalysts (III) are also well known. The platinum and rhodium compounds are preferably used. It is possible, in particular, to use the platinum complexes of an organic product described in patents U.S. Pat. No. 3,159,601, U.S. Pat. No. 3,159,602, U.S. Pat. No. 3,220,972 and European patents EP-A-0,057,459, EP-A-0,188,978 and EP-A-0,190,530, the platinum complexes of vinylorganosiloxanes described in patents U.S. Pat. No. 3,419,593, U.S. Pat. No. 3,715,334, U.S. Pat. No. 3,377,432 and U.S. Pat. No. 3,814,730.

The catalyst generally preferred is platinum. In this case, the amount by weight of catalyst (III), calculated as weight of platinum metal, is generally between 2 and 400 ppm, preferably between 5 and 200 ppm, based on the total weight of the polyorganosiloxanes (I) and (II).

The filler (V) optionally envisaged is preferably inorganic. It can consist of products chosen from (non) siliceous materials.

As regards siliceous materials, they can act as reinforcing or semi-reinforcing fillers.

The reinforcing siliceous fillers are chosen from colloidal silicas, combustion silica powders and precipitation silica powders, or a mixture thereof.

These powders have an average particle size generally of less than 0.1 μm and a BET specific surface of greater than 50 m$^2$/g, preferably between 150 and 350 m$^2$/g.

Semi-reinforcing siliceous fillers, such as diatomaceous earths or ground quartz, can also be used.

As regards the non-siliceous inorganic materials, they can be involved as semi-reinforcing or packing inorganic fillers. Examples of these non-siliceous fillers which can be used alone or as a mixture are carbon black, titanium dioxide, aluminium oxide, hydrated alumina, expanded vermiculite, non-expanded vermiculite, calcium carbonate, zinc oxide, mica, talc, iron oxide, barium sulphate and slaked lime. These fillers generally have a particle size of between 0.001 and 300 μm and a BET surface of less than 100 m$^2$/g.

In practice, but in a non-limiting manner, the filler used is quartz or a mixture of quartz and silica.

The filler can be treated with all or some of at least one and/or other of the compounds (IV.1) to (IV.3) of the promoter (IV).

In terms of weight, it is preferred to use an amount of filler of between 20 and 50%, preferably between 25 and 35%, by weight relative to all of the constituents of the composition.

Advantageously, the silicone elastomer composition comprises at least one retardant (VI) for the addition reaction (crosslinking inhibitor) chosen from the following compounds:

polyorganosiloxanes, which are advantageously cyclic and substituted with at least one alkenyl, tetramethylvinyltetrasiloxane being particularly preferred, pyridine, organic phosphines and phosphites, unsaturated amides, alkylated maleates and acetylenic alcohols.

These acetylenic alcohols (cf. FR-B-1,528,464 and FR-A-2,372,874), which form part of the preferred thermal blockers of the hydrosilylation reaction, have the formula:

R—(R')C(OH)≡CH in which formula,

R is a linear or branched alkyl radical or a phenyl radical;

R' is H or a linear or branched alkyl radical or a phenyl radical;

it being possible for the radicals R, R' and the carbon atom located α to the triple bond optionally to form a ring;

the total number of carbon atoms contained in R and R' being at least 5, preferably from 9 to 20.

The said alcohols are preferably chosen from those with a boiling point of greater than 250° C. Mention may be made, for example, of:

1-ethynyl-1-cyclohexanol;

3-methyl-1-dodecyn-3-ol;

3,7,11-trimethyl-1-dodecyn-3-ol;

1,1-diphenyl-2-propyn-1-ol;

3-ethyl-6-ethyl-1-nonyn-3-ol;

3-methyl-1-pentadecyn-3-ol.

These α-acetylenic alcohols are commercial products.

Such a retardant (VI) is present in a proportion of not more than 3000 ppm, preferably in a proportion of from 100 to 2000 ppm, relative to the total weight of the organopolysiloxanes (I) and (II).

In a manner which is known per se, the silicone elastomer composition can be supplemented with various conventional additives such as, for example, dyes.

According to a particularly preferred embodiment, the composition used according to the invention incorporates the constituents (I) to (VII) in the following proportions, as a % by weight of solids relative to the total mass:

| (I) | 1 to 80 | preferably | 10 to 60 |
|---|---|---|---|
| (II) | 0.1 to 20 | preferably | 0.5 to 10 |
| (III) | 0.0002 to 0.04 | preferably | 0.0005 to 0.02 |
| (IV.1) | 0.01 to 5 | preferably | 0.05 to 2 |
| (IV.2) | 0.01 to 5 | preferably | 0.05 to 2 |
| (IV.3) | 0.01 to 3 | preferably | 0.1 to 1 |
| (V) | 0 to 60 | preferably | 10 to 40 |
| (VI) | 0 to 0.5 | preferably | 0.005 to 0.3 |
| (VII) | 0 to 80 | preferably | 5 to 60. |

According to another of these aspects, the present invention relates to a two-component precursor system for the silicone elastomer composition described above. Such a precursor system is in two separate parts A and B, intended to be mixed together to form the composition, one of these parts A or B comprising the catalyst (III) and a single polyorganosiloxane species (I) or (II). Another characteristic of this precursor system is, on the one hand, that its part A or B containing the compound (IV.1) of the promoter (IV) does not comprise the catalyst (III), and, on the other hand, that the resin (VII) can be used in part A or part B or in the two parts A and B, part A or B containing the POS (II) and the resin (VII) being free of catalyst (III).

It should be noted that when the compound (IV.3) is a butyl titanate, it is preferable for it not to be contained in the same part A or B as the POS (II).

The composition can consist, for example, of a part A comprising the compounds (IV.1) and (IV.2), while the part B contains the compound (IV.3).

According to a first procedure for obtaining the two-component silicone composition A-B, a premix is first prepared by mixing together an inorganic filler (V), at least some of the resin (VII) and at least some of the polyorganosiloxane (I).

This premix serves as a base for obtaining, on the one hand, a part A resulting from mixing this part A with the polyorganosiloxane (II), optionally a crosslinking inhibitor and, finally, the compounds (IV.1) and (IV.2) of the promoter (IV).

Part B is prepared by mixing some of the premix targeted above and polyorganosiloxane (I), as well as colouring base, catalyst (Pt) and compounds (IV.3) of the promoter (IV).

According to a variant—a—of this first procedure, the unsaturated resin (VII) is used in dry form, without solvent external to the mixture (I) to (VII).

In practice, the resin (VII) is incorporated into the POS silicone oil (I).

According to a variant—b—of the first procedure, the unsaturated resin (VII) is used in solution in an organic solvent, which can, in practice, be the one used during the manufacture.

The solvent can be removed before incorporating the resin into the premix, or alternatively after doing so.

According to a second procedure for obtaining the two-component silicone composition A-B, no V, VII and I premixing is envisaged.

In accordance with the invention, the first procedure is the one which is preferred. The variants a and b of this first procedure are indifferently used. It should be noted that in the case of variant b, it is preferred to remove the solvent at the end of the preparation of the premix.

The viscosity of the parts A and B and of their mixture can be adjusted by modifying the amounts of the constituents and by choosing polyorganosiloxanes of different viscosity.

Once they have been mixed together, the parts A and B form a ready-to-use silicone elastomer composition (EVF II) which can be applied to the substrates to be adhesively bonded or to be coated by any suitable means (for example scraper or cylinder).

Crosslinking of the composition applied to the support to be coated can be brought about thermally and/or by electromagnetic (UV) radiation.

According to a noteworthy characteristic of the use according to the invention, the substrates which can be adhesively bonded by the composition are made of thermoplastic or thermosetting polymer, preferably of phenolic resin, of polyamide, of polyester, of ABS, of polycarbonate, of PVC, of polyether, of polyolefin or of epoxy resin, etc.

The substrates can also be metallic, and can be, e.g.: raw or treated aluminiums, raw or treated steels, or lacquered metals.

Thus, the composition according to the invention is self-adhesive on aluminium (type AG3) and on steel (such as Sollac R1426) with a shear strength of from 1 to 5 MPa and cohesive 100% rupture in all cases.

The field of application of the use recommended by the invention is advantageously that of the adhesive bonding of construction components for vehicles, in particular motor vehicles or that of the adhesive bonding of construction components for household appliances, in particular washing machines.

In practice, the adhesive bonding applications in motor vehicles can be:

flexible adhesive bonding of plastic and metal components under the vehicle bonnet and in the body case, adhesive bonding of optical blocks, serigraphy of the flexible and metallic head gasket tracks.

According to a variant, this field of application can also be that of the adhesive bonding of electrical/electronic components, in particular in household appliances.

According to another of its aspects, the present invention is directed towards a process for dhesively bonding at least two substrates $S_1$ and $S_2$, haracterized in that it consists essentially:

in preparing a composition as defined above and/or a composition of the type used in the use as defined above, in applying this composition to at least one of the surfaces of $S_1$ and/or $S_2$ to be adhesively bonded, in fitting the bonded surfaces together, optionally, in placing $S_1/S_2$ under a press, and preferably, in heating the assembly.

The bonding agent or the adhesive composition according to the invention, the use of a silicone composition (I) to (VII) as an adhesive and similarly the adhesive bonding process according to the invention afford extremely advantageous results in terms of adhesion force, stability on storage before crosslinking or stability of the adhesive bond, mechanical properties, heat resistance of the adhesive bond, rheology before crosslinking which is adapted to the bonding application, capacity for adhesively bonding substrates of varied nature, and cost price.

The examples which follow describe the preparation of the crosslinkable adhesive silicone composition according to the invention and its characterization via the properties $\alpha,\beta,\delta,\gamma$. These examples will allow the invention to be understood more clearly and will bring forth its advantages and its embodiments. A comparison of the adhesive composition according to the invention with a coating composition according to the prior art will clearly demonstrate the differences and the performance of the invention.

EXAMPLES

Example 1

Coating Composition

This is a two-component silicone composition as described in the abovementioned patent.

A suspension referred to as premix No. 1 is first prepared by mixing together in a reactor at room temperature:

35 parts of resin (VII) of structure $MM^{vi}DD^{vi}Q$ containing 0.6% by weight of vinyl (Vi) groups and consisting of 17% by weight of $(CH_3)_3SiO_{0.5}$ units, 0.5% by weight of $(CH_3)_2ViSiO_{0.5}$ units, 75% by weight of $(CH_3)_2SiO$ units, 1.5% by weight of $(CH_3)ViSiO$ units and 8% by weight of $SiO_2$ units 23.2 parts by weight of a PDMS (I) blocked with $(CH_3)_2ViSiO_{0.5}$ units having a viscosity of 100,000 mPa·s and containing 0.003 SiVi function per 100 g of oil 11.8 parts by weight of a PDMS (I) blocked with $(CH_3)_2ViSiO_{0.5}$ units having a viscosity of 10,000 mPa·s and containing 0.005 SiVi function per 100 g of oil 29 parts by weight of a ground silica (V) with an average particle size of about 2 μm 1 part by weight of a hydrophobic reinforcing silica (V) which develops a specific surface of about 200 m²/g.

This paste is used to prepare the parts A and B of the two-component system.

Part A of the Two-component System No. 1

The following are mixed together in a reactor at room temperature:

94 parts by weight of premix No. 1

4 parts by weight of a poly(dimethyl)-(hydrogenomethyl)siloxane (II) blocked with $(CH_3)_2HSiO_{0.5}$ units, having a viscosity of 25 mPa·s and containing in total 0.7 SiH function per 100 g of oil 0.025 part by weight of ethynylcyclohexanol (VI)

1 part by weight of vinyltrimethoxysilane (VTMO) (IV.1)

1 part by weight of 3-glycidoxypropyltrimethoxysilane (GLYMO) (IV.2).

Part B of the Two-component System No. 1

The following are mixed together in a reactor at room temperature:

88.3 parts by weight of premix No. 1

7.6 parts of a PDMS (I) blocked with $(CH_3)_2 ViSiO_{0.5}$ units, having a viscosity of 100,000 mPa·s and containing 0.003 SiVi function per 100 g of oil 4 parts by weight of butyl orthotitanate (IV.2)

0.0215 part by weight of platinum metal (III) in the form of a metal complex known as a Karstedt catalyst.

The two-component system is obtained by mixing together, at room temperature, 100 parts of A and 10 parts of B. The composition C1 is thus obtained.

Example 2

Composition for Adhesive Bonding

This is a two-component silicone composition whose composition is particularly suitable for adhesive bonding.

A suspension referred to as premix No. 2 is first prepared by mixing together in a reactor at room temperature:

- 51.7 parts of resin of structure $MM^{vi}DD^{vi}Q$ (VII) containing 0.9% by weight of vinyl (Vi) groups and consisting of 21% by weight of $(CH_3)_3SiO_{0.5}$ units, 0.2% by weight of $(CH_3)_2ViSiO_{0.5}$ units, 67.8% by weight of $(CH_3)_2SiO$ units, 3% by weight of $(CH_3)ViSiO$ units and 8% by weight of $SiO_2$ units
- 15 parts by weight of a PDMS (I) blocked with $(CH_3)_2ViSiO_{0.5}$ units, having a viscosity of 10,000 mPa·s and containing 0.005 SiVi function per 100 g of oil
- 33.3 parts by weight of a ground silica (V) with an average particle size of about 2 μm.

This paste is used to prepare the parts A and B of the two-component system.

Part A of the Two-component System No. 1

The following are mixed together in a reactor at room temperature:

- 90.3 parts by weight of premix No. 2
- 5.6 parts by weight of a poly(dimethyl)-(hydrogenomethyl)siloxane (II) blocked with $(CH_3)_2HSiO_{0.5}$ units, having a viscosity of 25 mPa·s and containing in total 0.7 SiH function per 100 g of oil
- 0.04 part by weight of ethynylcyclohexanol (VI)
- 1.8 parts by weight of vinyltrimethoxysilane (VTMO) (IV.a)
- 1.8 parts by weight of 3-glycidoxypropyltrimethoxy-silane (GLYMO) (IV.b)

Part B of the Two-component System No. 1

The following are mixed together in a reactor at room temperature:

- 99.3 parts by weight of premix No. 2
- 0.7 part by weight of butyl orthotitanate (IV.3)
- 0.004 part by weight of platinum metal (III) in the form of a metal complex known as a Karstedt catalyst.

The two-component system is obtained by mixing together, at room temperature, 100 parts of A and 100 parts of B. The composition C2 is thus obtained.

Example 3

Alternative to the Preparation of the Premix of the Example

The following are mixed together at room temperature in a reactor which can be heated under vacuum:

- 15 parts by weight of a PDMS (I) blocked with $(CH_3)_3ViSiO_{0.5}$ units having a viscosity of 10,000 mPa·s and containing 0.005 SiVi function per 100 g of oil
- 35 parts by weight of a PDMS (I) blocked with $(CH_3)_3ViSiO_{0.5}$ units, having a viscosity of (I) 100,000 mPa·s and containing 0.005 SiVi function per 100 g of oil
- 16.7 parts, expressed as solids, of resin (VII) of structure $MD^{vi}Q$ prepared in a xylene phase and containing 2% by weight of vinyl (Vi) groups and consisting of 68% by weight of $(CH_3)_3SiO_{0.5}$ units, 7% by weight of $(CH_3)ViSiO$ units and 25% by weight of $SiO_2$ units
- 33.3 parts by weight of a ground silica with an average particle size of about 2 μm.

The reactor is then placed under a negative pressure (15 mmHg) and the temperature is brought to 150° C. until the solvent has been removed.

A premix No. 2 similar to the previous one is obtained.

Example 4

Performance 4.1 Adhesion

The adhesive performance (bonding force Fp) of the two-component systems C1 C2 of Examples 1 and 2 are evaluated by a peeling test Tp.

For this, a layer of controlled thickness of the two-component system is placed between two substrates and the two-component system is crosslinked.

After cooling, the force required to detach the substrates is measured using a tensile strength machine fitted with a device for recording the force exerted.

4.1.1 Plastic Polimer Substrates

Various substrates were tested:

Sa=a polyamide 66 fabric of 235 dtex woven to 28*27 strands (i.e. 28 strands per cm in the warp and 27 strands per cm in the weft)

Sb=a PET polyester fabric of 140 dtex woven to 28*27 strands (i.e. 28 strands per cm in the warp and 27 strands per cm in the weft)

SC=a flat PET film.

The following results were recorded:

TABLE I

| Two-component system | Substrate 1 | Substrate 2 | Weight per unit area g/m² | Peeling force N/mm |
|---|---|---|---|---|
| C1 | Sa | Sa | 50 | 0.15 |
| C2 | Sa | Sa | 50 | 0.70 |
| C1 | Sb | Sb | 60 | 0.10 |
| C1 | Sb | Sb | 100 | 0.25 |
| C2 | Sb | Sb | 60 | 0.20 |
| C2 | Sb | Sb | 100 | 0.45 |
| C1 | Sa | Sc | 60 | 0.20 |
| C2 | Sa | Sc | 60 | 0.60 |

The results give n show the very clear advantage of the two-component system C2.

The composition C2 also allows adhesive bonding on metal, in particular aluminium and plastics, in particular epoxy resins.

Among the advantages, it also turns out that this bonding agent which sets quickly under warm conditions (10 to 180 seconds at 160° C., for example) is stable for several days at room temperature.

This bonding agent is much easier to handle at room temperature and much faster-setting under warm conditions than other bonding agents such as room-temperature bonding agents RTBs (one-component room temperature vulcanizable silicones) and possibly accelerated two-component systems. The composition Cb 2can be adapted to many applications such as the fields of motor vehicles and household appliances.

Compared with other organic bonding agents, the composition C2 allows non-hot-melt bonding which withstands temperatures in particular of up to 225° C.

4.1.2 Metal Substrates
4.1.2.1 Evaluation of the Adhesion to Aluminium

The adhesion is measured by a shear test (ASTM-624-A).

A—Principles

A parallelepipedal silicone gasket 1 mm in thickness is applied between two test strips. The test piece thus obtained, after a period of crosslinking in a chamber at 150° C., is subjected to a tensile-shear stress. The bonding is characterized by the strain and the type of break (cohesive, adhesive, etc.).

B—Reagents

Methyl ethyl ketone, or alcohol, or similar solvent

C—Apparatus (i) ALU AG3 test strips of 100×25×4 mm, pierced at one end with a hole 10 mm in diameter to allow fastening of the test pieces to the jaws of the tensile strength machine.

The test strips must be precleaned with methyl ethyl ketone or a suitable solvent.

When an adhesion primer is used: carry out a light abrasive treatment of the surfaces for coating, in order to remove the surface layer of oxide.

(ii) Template

Aluminium support to allow the manufacture of the test pieces, with a part made of Teflon in the region of the silicone gasket to avoid adhesion of the elastomer to the support block.

This template allows the manufacture of a gasket 1 mm in thickness whose bonding surface is 25 mm×12.5 mm.

(iii) Temperature-controlled chamber at 150° C.

(iv) Zwick dynamometer whose speed is 10 mm/min∓2 mm/min, equipped with jaws for pulling the test piece.

D—Procedure (i) Preparation of the Test Pieces a Prepare the test strips and the template under the conditions of paragraph C.

b Provide three test pieces for each determination.

c Position the lower test strips and block them in.

d Next, working test piece by test piece:

Place a sufficient amount of product (slight excess) on the lower and upper test strips, while avoiding any inclusion of air.

Next, position the upper test strip and press uniformly until the template comes into contact, ensuring that a slight overflow is obtained over the entire length of the bond.

e When bonding of the test pieces is complete, block the retaining flanges of the upper test strips moderately.

f Place the test pieces to be crosslinked in a temperature-controlled chamber at 150° C.

q After crosslinking, remove the test pieces from the moulds.

h Continue the polymerization cycle under the conditions recommended for the product, while keeping them in the horizontal position in the temperature-controlled chamber.

(ii) Tension test

On each test piece, decohere any mould seams by notching this test piece using a sharp tool.

For the tension, refer to the instructions for using the dynamometer.

E—Calculation

A is the surface area in mm² covered by the test strips.

F is the force in Newtons at break.

R is the tensile strength in megapascals.

$R = F/S$

Calculate

Note:

The surface area S is normally 312.5 mm², the instructions for using the dynamometer indicate the possibility of calculating the breaking stress from the corrected surface area.

Calculate the average value of the breaking stress for the three test pieces; the difference between the minimum value and the maximum value must be less than 20% of the average value. If this is not the case, carry out a new determination on three test pieces.

Next, after a visual examination, assess the breaking mode as a percentage of cohesion:

100% cohesive: the break takes place in the bulk of the joint.

0% cohesive: the break takes place solely on one of the faces of the support.

The support plates are made of raw AG3 aluminium of dimensions 100×25×4 mm.

The composition C2 is placed between two of these plates so as to create a joint 1 mm in thickness which occupies an area of 25×25 mm.

The assembly is consolidated by heating at 150° C. for 2 h.

The adhesion is measured using a dynamometer; the breaking strength of the assembly in MPa and the degree of cohesive or adhesive breaking are expressed in MPa.

In the case of composition C2, the following were obtained:

Breaking strain=5 MPa

Degree of cohesive breaking=100%.

4.1.2.2 EVALUATION OF THE ADHESION TO STEEL

The adhesion is measured by a shear test (ASTM standard 624-A) on the one hand, and by a 180° peel strength test (standard NFT-46008) on the other hand. The steel used is the material sold under the name Sollac R1426®.

(1) Preparation of the Test Pieces

A) Shear Test

1st step: two blocks of stainless steel 50 μm thick and 10 mm wide are placed on a first strip of steel 500 μm thick, 150 mm long and 25 mm wide, at 90° relative to the strip of steel. The first block is placed at one of the ends of the strip of steel and the second is placed 60 mm away from the first.

2nd step: Preparation of the steel/silicone adhesive/steel "sandwich". An excess of silicone adhesive of composition C2 is placed on this first strip of steel, between the two blocks. A second strip of steel, of the same size, is placed in the continuation of the first strip, so as to cover only the assembly formed by the blocks and the adhesive. It is the surface coated with adhesive which will serve to calculate the adhesive strengths. In this way, about half of each strip of steel is free of adhesive. It is to these parts not coated with silicone that the jaws of the dynamometer will be attached to evaluate the shear adhesion.

3rd step: Stoving of the "sandwich" at 150° C. for 1 minute.

4th step: Crosslinking of the silicone adhesive, under a heating press at 200° C., for 2 minutes, under a pressure of 700 to 900 MPa.

B) Peel strength test

1st step: Two blocks of stainless steel 50 μm thick and 10 mm wide are placed on a first strip of steel 500 μm thick, 150 mm long and 25 mm wide, at 90° relative to the strip of steel. The first block is placed at one of the ends of the strip of steel and the second is placed 10 cm away from the first.

2nd step: Preparation of the steel/silicone adhesive/steel "sandwich". An excess of silicone adhesive of composition C2 is placed on this first strip of steel, between the two blocks. A second strip of steel, of the same size, is placed on the first strip, such that it exactly superimposes the first strip, but is separated therefrom by the assembly formed by the blocks and the adhesive. It is the surface coated with adhesive which will serve to calculate the adhesive strengths. In this way, about half of each strip of steel is free of adhesive.

3rd step: Stoving of the "sandwich" at 150° C. for 1 minute.

4th step: Crosslinking of the silicone adhesive, under a heating press at 200° C., for 2 minutes, under a pressure of 700 to 900 MPa.

5th step: The parts free of adhesive are folded symmetrically at 90°. These two parts are then in the continuation of each other, forming an angle of 180°. They will serve as points of attachment to the jaws of the dynamometer in order to evaluate the 180° peel adhesion.

(2) Evaluation of the Adhesion

In the two tests performed, the evaluation is carried out using a Zwick dynamometer under the conditions mentioned above in paragraph 4.1.2.1/(iv).

(3) Expressing the Results

A) Shear Test

The average value of the breaking strength, R=F/S in which F is the tensile force in newtons of the mobile jaw at the time of failure and S is the surface area in mm² of the overlapping between the two plates (or surface area of the silicone adhesive in contact with a plate, i.e. 1500 mm²), is equal to 2.3 Mpa.

B) 180° Peel Test

The result is expressed in N/mm. It is given by the value of the ratio F/L in which F is the tensile force in newtons of the mobile jaw, measured at the peak of the curve giving the tensile force F as a function of the displacement L of the mobile jaw expressed in mm. The average value of the ratio F/L is equal to 7.25 N/mm.

What is claimed is:

1. A crosslinkable adhesive silicone composition consisting essentially of the following constituents:
   (I) 1 to 80% by weight of at least one polyorganosiloxane containing, per molecule, at least two alkenyl groups linked to the silicon and having a viscosity of 10,000 mPa·s;
   (II) 0.1 to 20% by weight of at least one polyorganosiloxane containing, per molecule, at least three hydrogen atoms linked to the silicon;
   (III) 0.0002 to 0.04% by weight of a catalytically effective amount of at least one platinum group metal catalyst;
   (IV) an adhesion promoter consisting essentially of a mixture of:
      (IV.1) 0.01 to 5% by weight of at least one alkoxylated organosilane containing, per molecule, at least one $C_2$–$C_6$ alkenyl group;
      (IV.2) 0.01 to 5% by weight of at least one organosilicon compound comprising at least one epoxy radical; and
      (IV.3) 0.01 to 3% by weight of at least one chelate of a metal M and/or a metal alkoxide of the formula:

M(OJ)$_n$, where n=valency of M and J=linear or branched $C_1$–$C_8$ alkyl,
   (V) 0 to 60% by weight of an inorganic filler,
   (VI) 0 to 0.5% by weight of at lest one crosslinking inhibitor, and
   (VII) 0 to 80% by weight of at least one polyorganosiloxane resin, bearing siloxy units Q and/or T and alkenyl groups;

all percentages being based on the total weight of the constituents (I) to (VII) of the crosslinkable adhesive silicone composition, the composition exhibiting:
   a peeling force $F_p$ (N/mm) greater than or equal to 0.25;
   a viscosity η ($10^3$ mPa·s at 25° C.), immediately after mixing together all constituents, of greater than or equal to 50;
   a tear strength $R_d$ (N/mm) after crosslinking, of greater than or equal to 6; and
   a Shore A hardness after crosslinking, of greater than or equal to 35.

2. A method for adhesively bonding a substrate which comprises applying the crosslinkable adhesive silicone composition of claim 1 to at least one substrate.

3. The composition according to claim 1, wherein the alkoxylated organosiloxane (IV.1) of the promoter (IV) corresponds to the following formula:

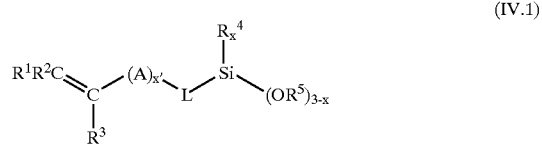

in which:
   $R^1$, $R^2$ and $R^3$ are hydrogen or identical or different hydrocarbon-based radicals,
   A is a linear or branched $C_1$–$C_4$ alkylene,
   L is a valency bond or oxygen,
   $R^4$ and $R^5$ are identical or different radicals and represent a linear or branched $C_1$–$C_4$ alkyl,
   x'=0 or 1, and
   x=0 to 3.

4. The composition according to claim 1, wherein the organosilicon compound (IV.2) of the promoter (IV) is chosen
   either from the products (IV.2 a) of the following formula:

in which:
   $R^6$ is a linear or branched $C_1$–$C_4$ alkyl radical,
   $R^7$ is a linear or branched alkyl radical,
   y is equal to 0,1,2 or 3,

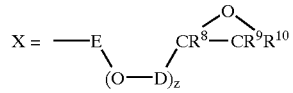

E and D are identical or different radicals chosen from linear or branched $C_1$–$C_4$ alkylenes, z is equal to 0 or 1, $R^8$, $R^9$ and $R^{10}$ are identical or different radicals representing hydrogen or a linear or branched $C_1$–$C_4$ alkyl, $R^8$, $R^9$ and $R^{10}$ optionally together with the two carbons bearing the epoxy, constitute a 5- to 7-membered ring, or from the products (IV.2b) comprising epoxy functional polydiorganosiloxanes containing at least one unit of formula:

$$X_P G_q SiO_{\frac{4-(p+q)}{2}} \quad \text{(IV.2b}_1\text{)}$$

in which

X is the radical as defined above for formula (IV.2a),

G is a monovalent hydrocarbon-based group which has no unfavourable action on the activity of the catalyst, p=0, 1 or 2, q=1, 2 or 3, p+q=1, 2 or 3, optionally at least some of the other units of these polydiorganosiloxanes are units of average formula:

$$G_r SiO_{\frac{4-r}{2}} \quad \text{(IV.2b}_2\text{)}$$

in which G has the same meaning as above and r has a value of between 0 and 3.

5. The composition according to claim 1, wherein the metal M of the chelate and/or of the alkoxide (IV.3) comprises: Ti, Zr, Ge, Li or Mn.

6. The composition according to claim 1, wherein the adhesion promoter comprises:

vinyltrimethoxysilane (VTMS) (IV.1), 3-glycidoxypropyltrimethoxysilane (GLYMO) (IV.2), and butyl titanate (IV.3).

7. The composition according to claim 1, wherein the proportions between (IV.1), (IV.2) and (IV.3), expressed as a % by weight relative to the total of the three, are as follows:

(IV.1) between 15 and 70, (IV.2) between 15 and 70, and (IV.3) between 5 and 25.

8. The composition according to claim 1, wherein the adhesion promoter (IV) is present in a proportion of from 0.1 to 10% by weight relative to all of the constituents of the crosslinkable adhesive silicone composition.

9. The composition according to claim 1, wherein the polyorganosiloxane resin (VII) comprises at least two vinyls per molecule and corresponds to one of the following two formulae:

(VII.1) MM$^{vi}$DD$^{vi}$Q or (VII.2) MD$^{vi}$Q, wherein:

M=(CH$_3$)$_3$SiO$_{0.5}$,

M$^{vi}$=(CH$_3$)$_2$ViSiO$_{0.5}$,

D=(CH$_3$)$_2$SiO,

D$^{vi}$=CH$_3$ViSiO, and

Q=SiO$_2$.

10. The composition according to claim 9, wherein the resin (VII) contains units Q in a proportion of at least 5%.

11. The composition according to claim 1, wherein the proportions of (I) and (II) are such that the molar ratio of the hydrogen atoms linked to the silicon in (II) to the alkenyl radicals linked to the silicon in (I) is between 0.4 and 10.

12. A two-component system which is a precursor of the composition according to claim 1, wherein the components of the composition are in two separate parts A and B, to be mixed together to form the composition and one of these parts A or B comprises the catalyst (III) and a single polyorganosiloxane species (I) or (II);

the part A or B containing the compound (IV.1) of the promoter (IV) does not contain the catalyst (III); and the resin (VII) can be in part A or part B or in parts A and B, part A or B containing the POS (II) and the resin (VII) being free of catalyst (III).

13. The method according to claim 2, wherein the at least one substrate to be adhesively bonded by the composition is a metal or a thermoplastic or thermosetting polymer.

14. The method according to claim 2, wherein the substrate is a construction component for a vehicle or for a household appliance.

15. The method according to claim 2, wherein the substrate is an electrical/electronic component.

16. A process for adhesively bonding at least two substrates $S_1$ and $S_2$, comprising:

preparing a composition according to claim 1, applying said composition to a surface of $S_1$ and/or $S_2$ to be adhesively bonded, fitting the bonded surfaces together, and optionally, placing $S_1/S_2$ under a press.

17. A method which comprises applying the two-component adhesive system according to claim 12 to at least one substrate.

18. The composition according to claim 1, wherein the constituents (I) to (VII) are used in the following proportions, as a % by weight of solids relative to the total weight of the composition:

(I) 10 to 60

(II) 0.5 to 10

(III) 0.005 to 0.02

(IV.1) 0.05 to 2

(IV.2) 0.05 to 2

(IV.3) 0.1 to 1

(V) 10 to 40

(VI) 0.05 to 0.3

(VII) 5 to 60.

19. The composition according to claim 3, wherein $R^1$, $R^2$ and $R^3$ are each selected from the group consisting of hydrogen, a linear or branched $C_1$–$C_4$ alkyl and a optionally substituted with at least one $C_1$–$C_3$ alkyl.

20. The method according to claim 13, wherein the at least one substrate to be adhesively bonded is selected from the group consisting of metal, polyamide, polyester, polyether, polyolefin, epoxy resin, ABS resin, polycarbonate and phenolic.

* * * * *